United States Patent
Noguchi

(10) Patent No.: US 10,880,481 B2
(45) Date of Patent: Dec. 29, 2020

(54) IMAGE STABILIZATION CONTROL APPARATUS, IMAGE CAPTURING APPARATUS, IMAGE CAPTURING SYSTEM, CONTROL METHOD, AND STORAGE MEDIUM

(71) Applicant: CANON KABUSHIKI KAISHA, Tokyo (JP)

(72) Inventor: Masaaki Noguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/229,038

(22) Filed: Dec. 21, 2018

(65) Prior Publication Data

US 2019/0199930 A1    Jun. 27, 2019

(30) Foreign Application Priority Data

Dec. 26, 2017 (JP) ................................ 2017-250100

(51) Int. Cl.
H04N 5/232 (2006.01)

(52) U.S. Cl.
CPC ..... *H04N 5/23267* (2013.01); *H04N 5/23258* (2013.01); *H04N 5/23264* (2013.01); *H04N 5/23274* (2013.01); *H04N 5/23287* (2013.01)

(58) Field of Classification Search
CPC ........... H04N 5/23258; H04N 5/23261; H04N 5/23264; H04N 5/23267; H04N 5/23274; H04N 5/23287
See application file for complete search history.

(56) References Cited

U.S. PATENT DOCUMENTS

| 2005/0212917 A1* | 9/2005 | Kakiuchi | H04N 5/23287 348/208.2 |
| 2007/0058957 A1* | 3/2007 | Hosoda | H04N 5/23287 396/55 |

(Continued)

FOREIGN PATENT DOCUMENTS

| CN | 101018292 A | 8/2007 |
| CN | 102754023 A | 10/2012 |

(Continued)

OTHER PUBLICATIONS

The above patent documents were cited in a European Partial Search Report dated Aug. 23, 2019, which is enclosed, that issued in the corresponding European Patent Application No. 18211508.9.

(Continued)

*Primary Examiner* — Amy R Hsu
(74) *Attorney, Agent, or Firm* — Cowan, Liebowitz & Latman, P.C.

(57) ABSTRACT

An image stabilization control apparatus acquires information regarding a shutter speed related to image capturing that is to be performed by the image capturing apparatus, and controls to cause a first correction unit and a second correction unit that respectively employ different correction methods, to correct shake of the image capturing apparatus. The image stabilization control apparatus changes the allocation of correction of the shake to the first correction unit and the second correction unit based on information regarding the shutter speed.

17 Claims, 8 Drawing Sheets

(56) References Cited

U.S. PATENT DOCUMENTS

| | | | | |
|---|---|---|---|---|
| 2007/0097219 A1* | 5/2007 | Nomura | ............ | H04N 5/23287 348/208.7 |
| 2007/0242937 A1* | 10/2007 | Sano | ................ | H04N 5/23241 396/55 |
| 2009/0316010 A1* | 12/2009 | Nomura | ............ | H04N 5/23258 348/208.6 |
| 2011/0141297 A1* | 6/2011 | Orimoto | ............ | H04N 5/2258 348/208.4 |
| 2013/0063615 A1* | 3/2013 | Takeuchi | .......... | H04N 5/23258 348/208.5 |
| 2013/0155262 A1* | 6/2013 | Katoh | ............... | H04N 5/23283 348/208.5 |
| 2014/0313354 A1 | 10/2014 | Kusanagi | | |
| 2015/0309329 A1* | 10/2015 | Shibata | ............. | H04N 5/23258 359/557 |
| 2017/0078577 A1* | 3/2017 | Wakamatsu | ....... | H04N 5/23267 |

FOREIGN PATENT DOCUMENTS

| | | |
|---|---|---|
| CN | 104793429 A | 7/2015 |
| CN | 105007406 A | 10/2015 |
| EP | 2605510 A1 | 6/2013 |
| JP | 4518197 B | 8/2010 |
| JP | 2013-126075 A | 6/2013 |

OTHER PUBLICATIONS

The above documents were cited in a Aug. 28, 2020 Chinese Office Action, which is enclosed with an English Translation, that issued in Chinese Patent Application 201811601781.4.

* cited by examiner

IMAGE STABILIZATION CONTROL APPARATUS, IMAGE CAPTURING APPARATUS, IMAGE CAPTURING SYSTEM, CONTROL METHOD, AND STORAGE MEDIUM

BACKGROUND OF THE INVENTION

Field of the Invention

The present invention relates to an image stabilization control apparatus, an image capturing apparatus, an image capturing system, a control method, and a storage medium, and particularly to technology for performing correction regarding an influence of shake of an image capturing apparatus, using a plurality of types of methods.

Description of the Related Art

Image capturing apparatuses in recent years, such as digital cameras and video cameras, are equipped with the function of performing correction regarding an influence of shake of the apparatuses on captured images. Using this function, the apparatuses can provide captured images with fine quality.

There are various methods for detecting shake of an image capturing apparatus and performing correction regarding an influence of the shake, and such methods are each realized using a different mechanism or a different piece of software. For example, there is an optical shake correction method, which is a method for reducing an image blur by driving an image stabilization lens mechanism provided in an image optical system, to correct the image blur (displacement of the position of an optical image formed on an image sensor) caused by shake. There is also an electronic shake correction method, which is a method for stabilizing the position of a subject image in captured images that are successively output, by defining, on some pixels of the image sensor, a region that is to be output (extracted) as a captured image, and adjusting the position of the extraction region in response to shake.

Some image capturing apparatuses employ both the optical shake correction method and the electronic shake correction method described above to realize shake correction with consideration given to characteristics of each method (Japanese Patent No. 4518197).

The image capturing apparatus disclosed in Japanese Patent No. 4518197 is configured to classify the components of detected shake into high-frequency components and low-frequency components, and use the optical shake correction method to perform correction corresponding to shake of the high-frequency components, and use the electronic shake correction method to perform correction corresponding to shake of the low-frequency components.

However, the image stabilization function utilizing the electronic shake correction, in particular, may not be realized in a favorable manner, depending on conditions for image capturing. More specifically, under low-light intensity conditions where the shutter speed is low, for example, so-called "accumulated shake" may occur, which is a blur occurring in a subject image due to the position at which an optical image is formed being displaced during exposure, and therefore, it may be impossible to acquire a favorable image even if a region that is to be cut out is adjusted. That is, under such conditions for image capturing where the shutter speed is low, even if a region that is to be cut out is adjusted, it may be impossible to acquire a favorable output image because the captured image signals have already been influenced by accumulated shake. The image capturing apparatus disclosed in Japanese Patent No. 4518197 does not take such conditions for image capturing into consideration at all.

SUMMARY OF THE INVENTION

The present invention was made in view of such problems in the conventional technique. The present invention provides an image stabilization control apparatus, an image capturing apparatus, an image capturing system, a control method, and a storage medium that realize favorable shake correction corresponding to the shutter speed.

The present invention in its first aspect provides an image stabilization control apparatus comprising: a detection unit configured to detect shake of an image capturing apparatus; an acquisition unit configured to acquire information regarding a shutter speed related to image capturing that is to be performed by the image capturing apparatus; and a control unit configured to perform control to cause a first correction unit and a second correction unit that respectively employ different correction methods, to correct shake detected by the detection unit, so as to change the allocation of correction of the shake to the first correction unit and the second correction unit based on information regarding the shutter speed acquired by the acquisition unit, wherein the second correction unit employs an electronic shake correction method, and corrects the shake by changing a region that is to be extracted from an image signal acquired through image capturing, and the control unit changes a movable area that can be used to extract the region from the image signal that is to be subjected to correction performed by the second correction unit, according to the shutter speed.

The present invention in its second aspect provides an image capturing apparatus comprising: a detection unit configured to detect shake of the image capturing apparatus; a first correction unit and a second correction unit for correcting an influence of the shake detected by the detection unit, on a captured image, the first correction unit and the second correction unit employing different correction methods; an acquisition unit configured to acquire information regarding a shutter speed related to image capturing that is to be performed by the image capturing apparatus; and a control unit configured to perform control to cause the first correction unit and the second correction unit to correct shake detected by the detection unit, so as to change the allocation of correction of the shake to the first correction unit and the second correction unit based on information regarding the shutter speed acquired by the acquisition unit, wherein the second correction unit employs an electronic shake correction method, and corrects the shake by changing a region that is to be extracted from an image signal acquired through image capturing, and the control unit changes a movable area that can be used to extract the region from the image signal that is to be subjected to correction performed by the second correction unit, according to the shutter speed.

The present invention in its third aspect provides an image capturing system that includes an image stabilization control apparatus and an image capturing apparatus, the image capturing system comprising: a detection unit configured to detect shake of the image capturing apparatus; an acquisition unit configured to acquire information regarding a shutter speed related to image capturing that is to be performed by the image capturing apparatus; and a first correction unit and a second correction unit for correcting an influence of the shake detected by the detection unit, on a captured image, the first correction unit and the second correction unit employing different correction methods; a control unit configured to perform control to cause the first correction unit and the second correction unit to correct shake detected by the detection unit, so as to change the allocation of correction of the shake to the first correction unit and the second correction unit based on information regarding the shutter speed acquired by the acquisition unit, wherein the second correction unit employs an electronic shake correction method, and corrects the shake by changing a region that is to be extracted from an image signal acquired through image capturing, and the control unit changes a movable area that can be used to extract the region from the image signal that is to be subjected to correction performed by the second correction unit, according to the shutter speed.

The present invention in its fourth aspect provides a method for controlling an image stabilization control apparatus, the method comprising: detecting shake of an image capturing apparatus; acquiring information regarding a shutter speed related to image capturing that is to be performed by the image capturing apparatus; and performing control to cause a first correction unit and a second correction unit that respectively employ different correction methods, to correct the detected shake, so as to change the allocation of correction of the shake to the first correction unit and the second correction unit based on information regarding the acquired shutter speed, wherein the second correction unit employs an electronic shake correction method, and corrects the shake by changing a region that is to be extracted from an image signal acquired through image capturing, and the control is performed such that a movable area that can be used to extract the region from the image signal that is to be subjected to correction performed by the second correction unit is changed according to the shutter speed.

Further features of the present invention will become apparent from the following description of exemplary embodiments (with reference to the attached drawings).

DESCRIPTION OF THE EMBODIMENTS

First Embodiment

The following describes illustrative embodiments of the present invention in detail with reference to the drawings. Note that the embodiment described below is an example in which the present invention is applied to a digital camera 100 that is an example of an image stabilization control apparatus capable of detecting shake that has occurred, and reducing an influence of the shake on a captured image by performing two types of correction. However, the present invention is applicable to any device that is capable of detecting shake of an image capturing apparatus, and reducing an influence of the shake on a captured image by performing a plurality of types of correction.

Configuration of Digital Camera 100

Figure 1:
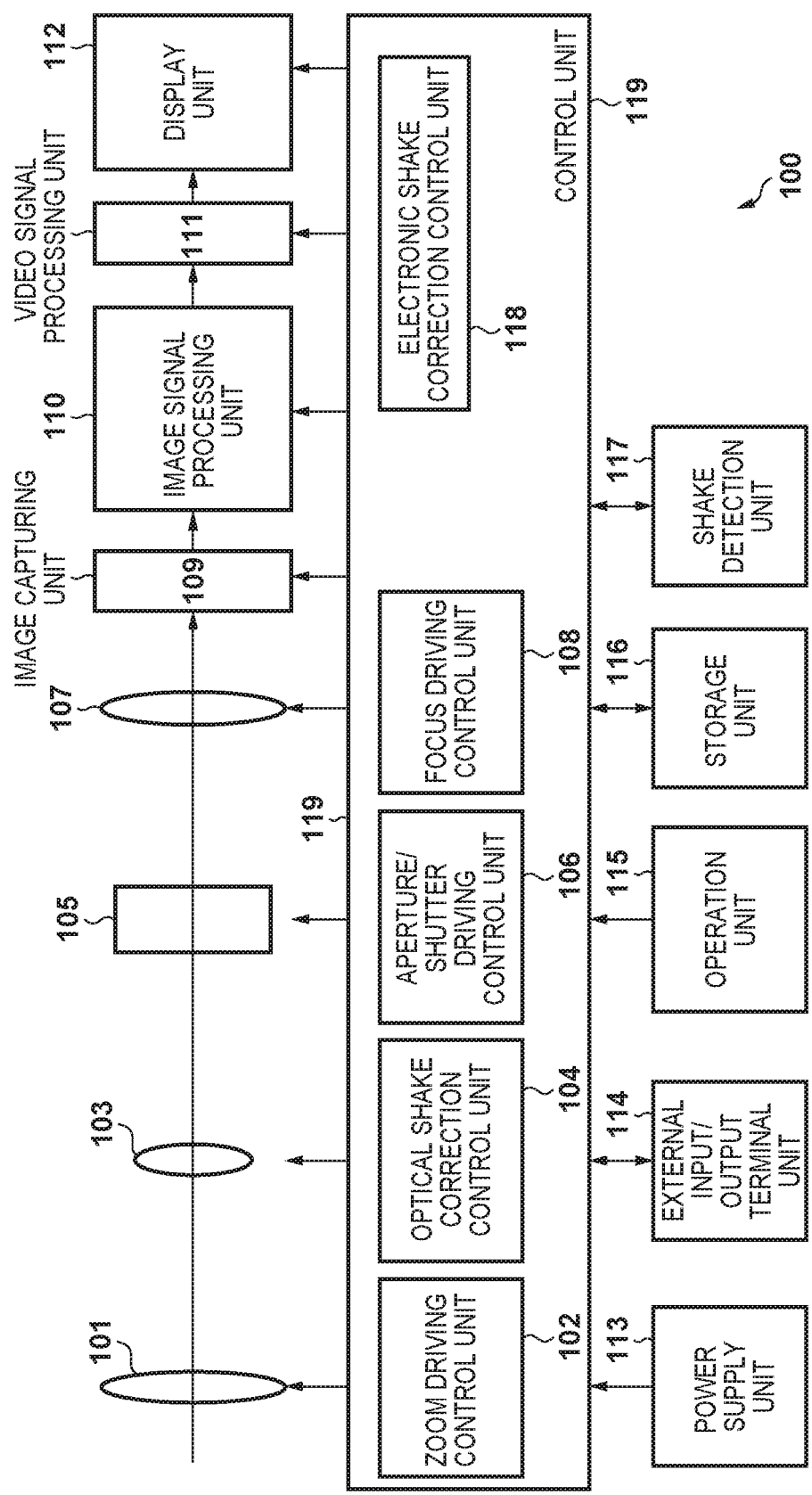
FIG. 1 is a block diagram showing a functional configuration of a digital camera 100 according to a first embodiment and a modification of the present invention.

FIG. 1 is a block diagram showing a functional configuration of a digital camera 100 according to embodiments of the present invention. In the present embodiment, the digital camera 100 is integrated with a lens, and is capable of performing still image shooting and moving image shooting.

A zoom unit 101 is a lens unit that includes a zoom lens that changes the focal length from among image capturing settings, a driving mechanism for the zoom lens, a position detection sensor, and so on. As a result of the zoom lens in the zoom unit 101 being moved in the optical axis direction, the focal length changes, and thus an optical image formed on the image sensor of the image capturing unit 109 described below changes. Driving control for the zoom unit 101 is performed by a zoom driving control unit 102. The zoom driving control unit 102 performs driving control on the zoom lens, and is therefore configured to be able to detect the position of the zoom lens (the zoom position) on the optical axis.

A shake correction lens unit 103 is one component of the digital camera 100 according to the present embodiment that performs correction regarding an influence of shake of the digital camera 100 (an image blur). The shake correction lens unit 103 includes a shake correction lens (a shift lens) for correcting displacement, caused by shake, of the position at which an optical image of the subject is formed on the image sensor, a driving mechanism for the shift lens, a position detection sensor, and so on. The shift lens in the shake correction lens unit 103 is moved in a direction orthogonal to the optical axis, and thus an image blur is corrected such that the position at which an optical image related to the subject is formed is maintained. The direction in which the shift lens is moved is not specifically limited, and need only include a directional component orthogonal to the optical axis. Driving control for the shake correction lens unit 103 is performed by an optical-type shake correction control unit 104. More specifically, the optical-type shake correction control unit 104 performs driving control by transmitting information (a drive signal) regarding a driving amount that has been determined in relation to correction, to the shake correction lens unit 103. In the present embodiment, the shake correction lens unit 103 and the optical shake correction control unit 104 serve as the first correction means according to the present invention, which realizes a correction function using an optical shake correction method for optically correcting an image blur.

An aperture/shutter unit 105 is a unit into which an aperture and a shutter are integrated. An aperture adjusts the amount of incident light to the image capturing unit 109, and the shutter controls the amount of exposure by opening and closing. Driving control for the aperture/shutter unit 105 is performed by an aperture/shutter driving control unit 106.

A focus unit 107 is a lens unit that includes a focus lens that performs focal point adjustment, a driving mechanism for the focus lens, a position detection sensor, and so on. As a result of the focus lens in the focus unit 107 being moved in the optical axis direction, the focal state of an optical image formed on the image sensor changes. Driving control for the focus unit 107 is performed by a focus driving control unit 108.

Note that the image optical system includes the zoom unit 101, the shake correction lens unit 103, the aperture/shutter unit 105, and the focus unit 107, and reflection light from the subject enters the digital camera 100 via the image optical system.

The image capturing unit 109 includes an image sensor such as a CCD or CMOS sensor, for example, and performs photoelectric conversion on an optical image that is formed on the imaging surface of the sensor by the image optical system, and thus outputs an analogue image signal (an electrical signal) related to the captured image. Note that it is possible to change imaging sensitivity by, for example, changing sensitivity in detecting signal charge accumulated in the image sensor, or changing the amplification gain of an amplifier circuit (not shown), under the control of a control unit 119.

An image signal processing unit 110 performs processing such as A/D conversion processing and development processing, to convert electrical signals output from the image capturing unit 109 to video signals. Also, video signals resulting from the conversion performed by the image signal processing unit 110 are processed by a video signal processing unit 111 according to the purpose. A display unit 112 is a display device such as an LCD, for example, and displays an image as appropriate, based on signals (output signals) output from the video signal processing unit 111. The display unit 112 performs through-the-lens display of signals that have been output as a result of image capturing, and thus functions as an electronic viewfinder.

A power supply unit 113 supplies power required by each block of the digital camera 100 to operate. An external input/output terminal unit 114 receives/outputs communication signals and video signals from/to an external entity. A shake detection unit 117 includes an angular velocity sensor or the like. Upon the digital camera 100 shaking, the shake detection unit 117 detects and outputs the amount of shake in each of the rotational directions (the pitch direction, the yaw direction, and the roll direction).

An electronic shake correction control unit 118 is one component of the digital camera 100 according to the present embodiment that performs correction regarding an influence of shake of the digital camera 100. The electronic shake correction control unit 118 realizes shake correction by controlling the video signal processing unit 111 such that the video signal processing unit 111 extracts signals in a region in which a certain subject image appears, from among image signals that have been successively captured by the image capturing unit 109, and outputs the extracted signals as output signals. In other words, the electronic shake correction control unit 118 performs shake correction by controlling operations of the video signal processing unit 111 such that a subject image in a specific image capturing area appears in an image related to output signals. Therefore, in a mode in which correction is performed, for example, the angle of view of an area corresponding to output signals is set to be smaller than the angle of view of an image capturing area that is to be subjected to photoelectric conversion performed by the image sensor, and image signals input to the video signal processing unit 111 include signals of excessive pixels that are not to be output. That is, the video signal processing unit 111 can use an area including excessive pixels to extract a region related to an output image, and can realize shake correction in the area (a movable area). Therefore, in the present embodiment, the electronic shake correction control unit 118 and the video signal processing unit 111 serve as the second correction means according to the present invention, which realizes a correction function using an electronic shake correction method for electronically correcting an image blur.

The control unit 119 is a microcomputer, for example, and controls operations of each block of the digital camera 100. Specifically, the control unit 119 reads out operation programs for the blocks, which are stored in a storage unit 116, for example, and loads the programs to a memory (not shown) and executes the programs to control operations of the blocks. Here, the storage unit 116 is a non-volatile memory, for example, and stores parameters and so on that are required for the blocks to operate, in addition to the operation programs for the blocks. The storage unit 116 may also be configured to store output signals (video information) and various kinds of data related to operations of the digital camera 100. In the present embodiment, the optical shake correction control unit 104 and the electronic shake correction control unit 118 are described as components that are separate from the control unit 119. However, these components may be realized as the control unit 119.

An operation unit 115 is a user interface of the digital camera 100, including a shutter release button and a switch, for example. Upon detecting an operation input to the user interface, the operation unit 115 outputs a control signal corresponding to the operation, to the control unit 119.

For example, the operation unit 115 includes a shake correction switch that is configured to be able to turn ON and OFF a mode in which shake correction is performed (a shake correction mode). In a state where the shake correction switch has been operated and a shake correction mode is to be executed, the control unit 119 performs control to cause the optical shake correction control unit 104 and the electronic shake correction control unit 118 to perform operations corresponding to the mode. In this control, optical shake correction and electronic shake correction may be separately set to be enabled/disabled.

Also, for example, the operation unit 115 includes a shooting mode selecting switch with which a still image shooting mode or a moving image shooting mode can be selected as a shooting mode that is to be executed. Upon one of the shooting modes being selected in response to the shooting mode selecting switch being operated, the control unit 119 performs control to operate the zoom unit 101, the optical shake correction control unit 104, the aperture/shutter unit 105, and the focus unit 107 according to the selected mode.

Also, for example, the operation unit 115 includes a shutter release button that is configured to sequentially turn ON a first switch (SW1) and then a second switch (SW2) according to pressed pushing depth. Upon the shutter release button being pressed by approximately halfway, the operation unit 115 outputs a SW1 signal indicating that the switch SW1 has been turned ON, and upon the shutter release button being fully pressed, the operation unit 115 outputs a SW2 signal indicating that the switch SW2 has been turned ON.

Upon the SW1 signal being output, the focus driving control unit 108 performs focusing by driving the focus unit 107, and the aperture/shutter driving control unit 106 sets an appropriate exposure amount by driving the aperture/shutter unit 105. Subsequently, upon the SW2 signal being output, image data that is based on an optical image that has undergone exposure performed by the image capturing unit 109 is stored in the storage unit 116.

Also, for example, the operation unit 115 includes a moving image recording switch. Upon the moving image recording switch being pressed, moving image shooting is started, and upon the switch being pressed again during the recording, the recording ends. Note that the user can perform still image shooting during moving image shooting by pressing the shutter release button.

Also, for example, the operation unit 115 includes a playback mode selecting switch for selecting a playback mode. Upon the playback mode being selected in response to the playback mode selecting switch being operated, the control unit 119 stops operations related to shake correction. At this time, the actuator of the shake correction lens unit 103 may be powered on, or powered off so that the shake correction lens unit 103 is fixed at a predetermined position.

Also, for example, the operation unit 115 includes a magnification switch for making an instruction to change the zoom ratio. Upon an instruction to change the zoom ratio being made in response to the magnification switch being operated, the zoom driving control unit 102, which has received an operational instruction via the control unit 119, drives the zoom unit 101 to move the zoom unit 101 (the zoom lens) to a specified zoom position.

Configuration Related to Shake Correction Function

Figure 2:
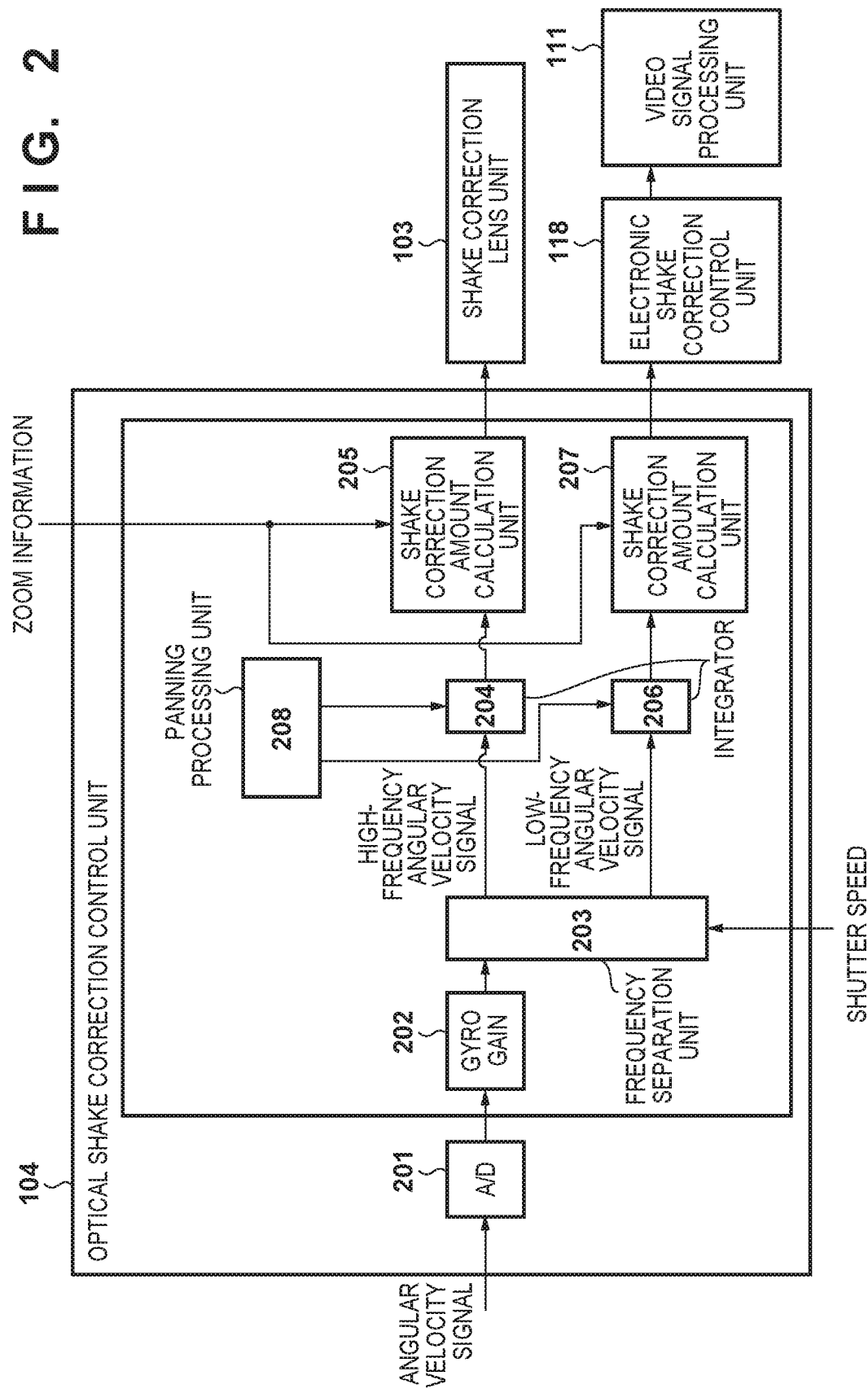
FIG. 2 is a block diagram showing a configuration of a shake correction function according to the first embodiment and the modification of the present invention.

Next, the following describes a configuration related to a shake correction function (an image stabilization function) realized by the digital camera 100 according to the present embodiment with reference to the block diagram shown in FIG. 2. Although the example in FIG. 2 shows that various blocks related to the realization of this function are realized by the optical shake correction control unit 104, the present invention is not necessarily implemented in such a way. That is, the blocks related to the realization of the function may be realized by the electronic shake correction control unit 118 or the control unit 119, or realized by some or all of the optical shake correction control unit 104, the electronic shake correction control unit 118, and the control unit 119 cooperating with each other.

Upon an angular velocity signal related to shake of the digital camera 100 being output by the shake detection unit 117, the signal is converted to digital data by an A/D conversion unit 201. In the present embodiment, the angular velocity sensor of the shake detection unit 117 is described as a sensor that outputs an analogue signal as an angular velocity signal. However, the sensor may be provided with an A/D conversion function. The angular velocity signal converted to digital data by the A/D conversion unit 201 is subjected to output adjustment performed by a gyro gain unit 202 in order to reduce fluctuation in the output values of the amount of shake, and is output to a frequency separation unit 203.

With reference to a frequency that is the first threshold value according to the present invention, the frequency separation unit 203 separates the input angular velocity signal into a high-frequency angular velocity signal that indicates shake corresponding to a frequency component more than the threshold value, and a low-frequency angular velocity signal that indicate shake corresponding to a frequency component less than the threshold value, and outputs them. More specifically, the frequency separation unit 203 determines a frequency that is to be used as a threshold value, based on information regarding the shutter speed related to control performed by the aperture/shutter driving control unit 106, which has been input from the control unit 119, and separates the angular velocity signal based on the threshold value.

Figure 3A:
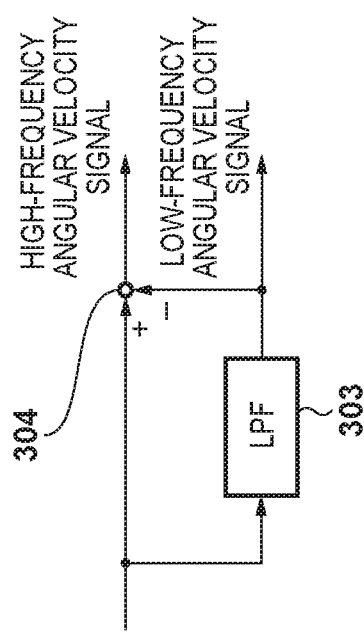
FIGS. 3A, 3B, 3C, and 3D illustrate separation of an angular velocity signal according to embodiments and the modification of the present invention.
Figure 3B:
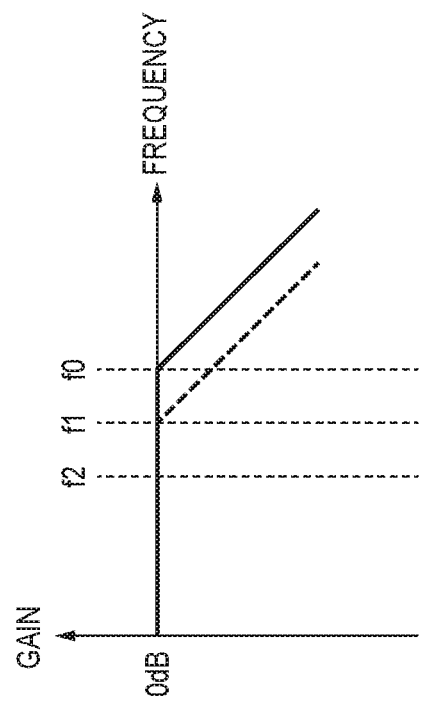

Here, FIGS. 3A and 3B show examples of the configuration of the frequency separation unit 203. If the frequency separation unit 203 is configured as shown in FIG. 3A, for example, the angular velocity signal that has been input (the input angular velocity signal) is input to a high-pass filter (HPF) 301, and thus high-frequency angular velocity signal indicating shake corresponding to a frequency component more than the threshold value is extracted and output. The high-frequency angular velocity signal is also output to a subtractor 302. The subtractor 302 subtracts a high-frequency angular velocity signal from the input angular velocity signal, and thus a low-frequency angular velocity signal is output. If the frequency separation unit 203 is configured as shown in FIG. 3B, for example, the input angular velocity signal is input to a low-pass filter (LPF) 303, and thus a low-frequency angular velocity signal indicating shake corresponding to a frequency component less than the threshold value is extracted and output. The low-frequency angular velocity signal is similarly output to a subtractor 304. The subtractor 304 subtracts a low-frequency angular velocity signal from the input angular velocity signal, and thus a high-frequency angular velocity signal is output.

Figure 3C:
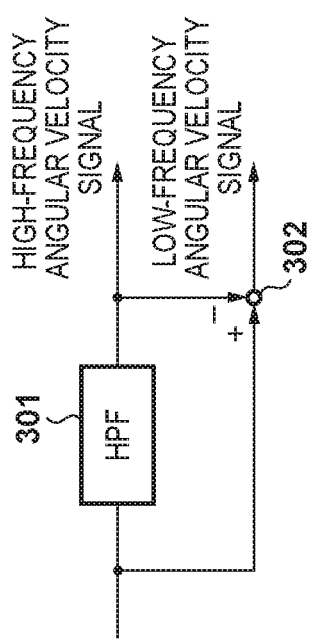
Figure 3D:
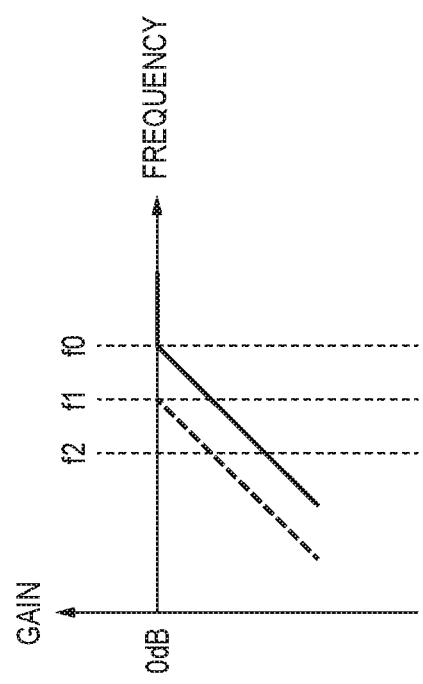

The frequency separation unit 203 according to the present embodiment is configured such that the threshold value (a separation frequency; a cutoff frequency) that is used to separate the input angular velocity signal into a high-frequency angular velocity signal and a low-frequency angular velocity signal can be changed according to the shutter speed, which will be described below in detail. For example, if the frequency separation unit 203 is configured as shown in FIG. 3A, the frequency versus gain characteristics of the HPF 301 may be those shown in FIG. 3C. As shown in the figure, it is possible to shift the frequency band of the high-frequency angular velocity signal toward the low-frequency side by changing the cutoff frequency of the HPF 301 from f0 (a reference separation frequency) to f1 (<f0). Also, for example, if the frequency separation unit 203 is configured as shown in FIG. 3B, the frequency versus gain characteristics of the LPF 303 may be those shown in FIG. 3D. As shown in the figure, it is possible to shift the frequency band of the low-frequency angular velocity signal toward the low-frequency side by changing the cutoff frequency of the LPF 303 from f0 (a reference separation frequency) to f1 (<f0). The high-frequency angular velocity signal is the difference between the input signal and the low-frequency angular velocity signal. Therefore, shifting the frequency band of the low-frequency angular velocity signal toward the low-frequency side is equivalent to shifting the frequency band of the high-frequency angular velocity signal toward the low-frequency side. By shifting the cutoff frequency toward the low-frequency side, it is possible to attenuate the low-frequency angular velocity signal and allocate the attenuated low-frequency angular velocity components to the high-frequency angular velocity signal.

Upon separating the input angular velocity signal, the frequency separation unit 203 outputs the separated high-frequency angular velocity signal to an integrator 204, and the separated low-frequency angular velocity signal to an integrator 206.

The integrator 204 and a shake correction amount calculation unit 205 derive a shake correction amount related to correction operations that are to be performed by the shake correction lens unit 103, based on the high-frequency angular velocity signal output from the frequency separation unit 203. The integrator 204 has the function of changing characteristics in any frequency band, and integrates high-frequency angular velocity signals input from the frequency separation unit 203. When the integrator 204 performs integration processing, a panning processing unit 208 performs processing to change the time constant of the integrator 204 from a reference time constant (a time constant that is initially set) according to the output from the frequency separation unit 203 or the output from the integrator. This is because if the time constant of the integrator 204 is large, it takes a long time for the increased output to converge to a near-zero value, and the limit of shake correction may be reached before the convergence. That is, the panning processing unit 208 controls the time constant of the integrator 204 such that the output from the integrator 204 converges to a near-zero value as soon as possible.

The shake correction amount calculation unit 205 derives the amount of correction that is to be performed by the shake correction lens unit 103 related to optical shake correction, based on the output signal from the integrator 204. Note that the upper limit of the amount of correction that can be performed by the shift lens on an image blur varies depending on zoom settings. Therefore, in the present embodiment, the shake correction amount calculation unit 205 specifies an area that can be corrected through optical shake correction, based on information regarding a zoom ratio output from the zoom driving control unit 102. Then, the shake correction amount calculation unit 205 multiplies the input high-frequency angular velocity signal by the degree of sensitivity to set a limit on the amount of correction determined based on the high-frequency angular velocity signal, so that the shift lens is driven within the area that can be corrected, thereby deriving an ultimate correction amount. The optical shake correction control unit 104 performs driving control on the shake correction lens unit 103 based on the correction amount thus derived.

On the other hand, the integrator 206 and a shake correction amount calculation unit 207 derive a shake correction amount related to correction operations that are to be performed by the video signal processing unit 111, based on the low-frequency angular velocity signal output from the frequency separation unit 203. The integrator 206 has the function of changing characteristics in any frequency band, and integrates low-frequency angular velocity signals input from the frequency separation unit 203. As with the integrator 204, when the integrator 206 performs integration processing, the panning processing unit 208 performs processing to control the time constant of the integrator 206.

The shake correction amount calculation unit 207 derives the amount of correction that is to be performed by the video signal processing unit 111 related to electronic shake correction, based on the output signal from the integrator 206. Regarding the shake correction amount calculation unit 207, as with the shake correction amount calculation unit 205, the upper limit of the amount of correction in accordance with shake correction that can be performed on an image blur varies depending on zoom settings. Therefore, in the present embodiment, the shake correction amount calculation unit 207 specifies an area (i.e. the movable area) that can be corrected through electronic shake correction, based on information regarding a zoom ratio output from the zoom driving control unit 102. Then, the shake correction amount calculation unit 207 sets a limit on the amount of correction determined based on the input low-frequency angular velocity signal, so that a region related to the signal to be output is extracted within the movable area, thereby deriving an ultimate correction amount (the shift amount of the extraction region). The optical shake correction control unit 104 transmits the correction amount thus derived, to the electronic shake correction control unit 118 to cause the electronic shake correction control unit 118 to perform control on the video signal processing unit 111 based on the correction amount.

As described above, processing in the present embodiment is realized by circuits and processors corresponding to the blocks of the digital camera 100, which are pieces of hardware. However, the present invention is not necessarily implemented in such a way, and processing performed by the blocks may be realized by a program that performs the same processing.

Correction Allocation Change

As described above, the digital camera 100 according to the present embodiment uses both the optical shake correction and the electronic shake correction to correct (reduce) an image blur caused by the digital camera 100. More specifically, the digital camera 100 according to the present embodiment allocates different correction amounts (frequency bands) to the two types of correction methods respectively according to conditions regarding an image capturing environment or image capturing settings, and thus performs shake correction.

As described above, if an image is captured under low-light intensity conditions or the like, the shutter speed is low and the exposure time is long. Therefore, accumulated shake is likely to occur during exposure. Accumulated shake is prominent in a captured image when the amount of shake is large and the frequency of shake is high. In other words, if the exposure time is long, the position at which an optical image of the subject is formed on the image sensor may change due to shake during exposure. As a result, the subject image is already blurred in the captured image signal. Therefore, even if the blur is extracted from the image signal and is subjected to electronic shake correction, shake correction cannot be performed in a favorable manner.

Figure 4A:
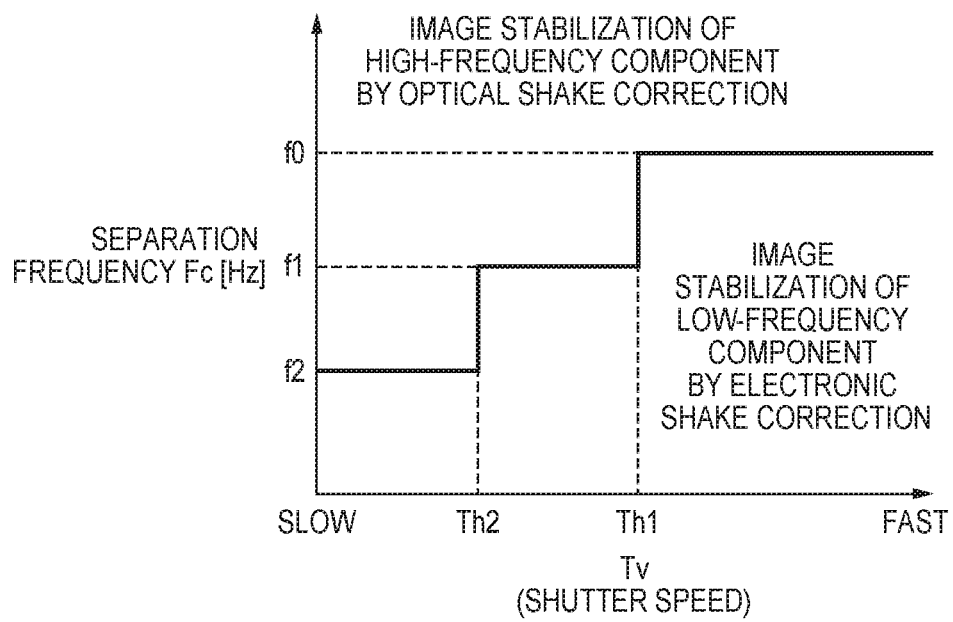
FIGS. 4A and 4B illustrate a separation frequency that is set by a frequency separation unit 203, according to the first embodiment and the modification of the present invention.

Therefore, in the digital camera 100 according to the present embodiment, if the exposure time is long during moving image shooting or through-the-lens display, for example, the separation frequency of the frequency separation unit 203 is shifted to the low-frequency side compared to when the shutter speed is high or normal. For example, as shown in FIG. 4A, the frequency separation unit 203 may be configured to be able to change the threshold value (the separation frequency), which is a reference for separation, according to the shutter speed (Tv). In the example shown in FIG. 4A, when the shutter speed is more than a predetermined value Th1 (e.g. 1/60), the separation frequency is set to be a reference separation frequency f) (e.g. 5 Hz) related to a normal allocation of optical shake correction and electronic shake correction. Also, if the image capturing environment is under even lower-light intensity conditions and the shutter speed is even lower (e.g. 1/15), the separation frequency is changed to f1 (e.g. 3 Hz). Similarly, if the shutter speed is less than a threshold value Th2 (e.g. not more than 1/4), the separation frequency is changed to f2 (e.g. 1 Hz). As a result, the frequency band that is to be allocated to electronic shake correction is shifted toward the low-frequency side so that correction related to high-frequency band is attenuated, whereas shake in a lower frequency band is allocated to optical shake correction, so that accumulated shake will be less prominent.

That is, in the digital camera 100 according to the present embodiment, when the shutter speed is low, the frequency band subjected to optical shake correction is expanded toward the low-frequency side compared to when the shutter speed is high or normal, and thus accumulated shake is reduced. On the other hand, the frequency band that is to be subjected to electronic shake correction is narrowed compared to when the shutter speed is higher or normal in order to avoid excessive correction. Through such correction allocation change, the digital camera 100 according to the present embodiment can perform favorable image blur correction according to the shutter speed.

Image Stabilization Control Processing

Figure 5:
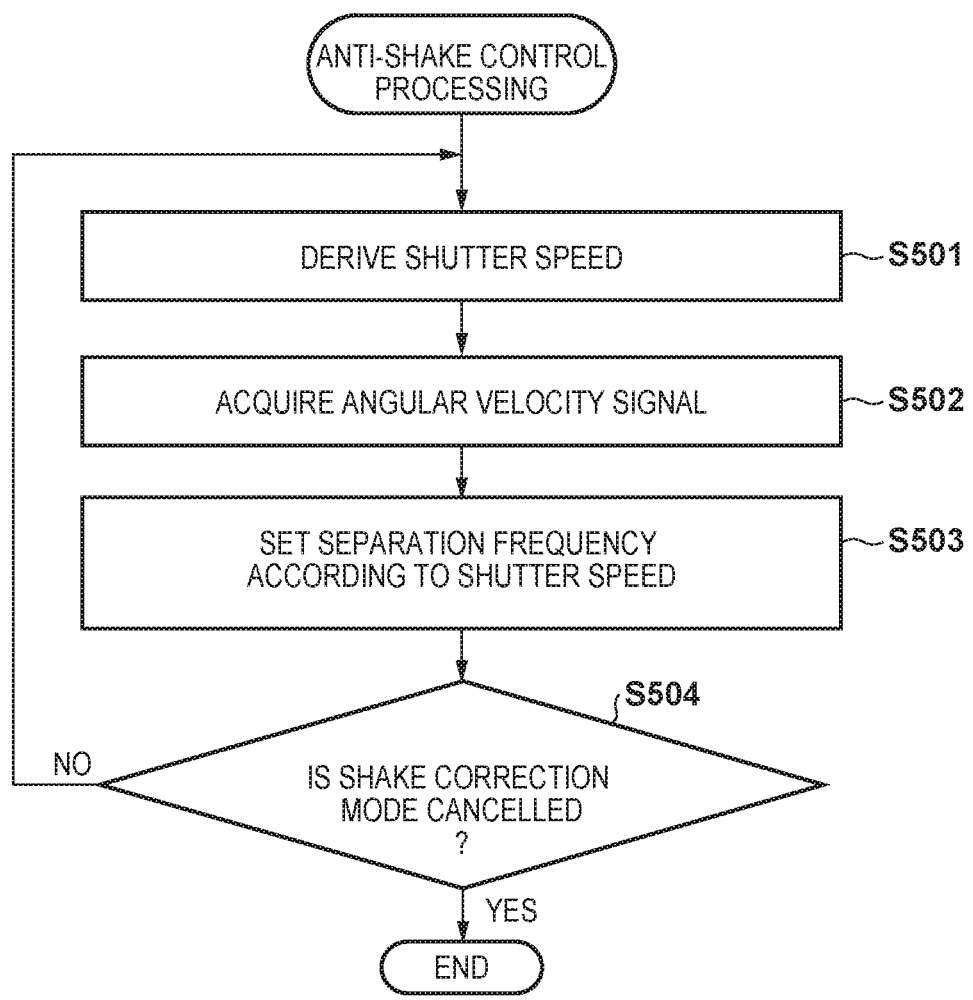
FIG. 5 is a flowchart illustrating image stabilization control processing that is executed by the digital camera 100 according to the first embodiment of the present invention.

The following specifically describes image stabilization control processing performed by the digital camera 100 with such a configuration according to the present embodiment with reference to the flowchart shown in FIG. 5. Processing according to the flowchart is realized by the control unit 119 reading a processing program corresponding to the processing, stored in the storage unit 116, for example, loading the program to a memory (not shown), and executing the program. The image stabilization control processing in the following description is started when the digital camera 100, which has been set to the shake correction mode, performs through-the-lens display or moving image shooting, for example.

In step S501, the control unit 119 derives a shutter speed Tv related to image capturing. The shutter speed may be determined by the control unit 119 based on the result of analysis of a shooting environment and supplied to the aperture/shutter driving control unit 106, for example, or acquired from the aperture/shutter driving control unit 106. Also, the shutter speed derived in this step is not limited to that determined in relation to the frame in which an image is captured, and may be derived based on the moving average related to the most recent five frames.

In step S502, the A/D conversion unit 201 and the gyro gain unit 202 acquire a digital angular velocity signal that is to be corrected in relation to the frame, based on an analogue angular velocity signal related to shake detected by the shake detection unit 117.

In step S503, the frequency separation unit 203 sets the separation frequency of the angular velocity signal based on the shutter speed derived in step S501. The separation frequency may be determined by comparing the threshold value related to the shutter speed and the derived shutter speed as shown in FIG. 4A, for example. In the example shown in FIG. 4A, when the shutter speed is more than the threshold value Th1, which is a reference separation frequency, the separation frequency is set to be f0, and when the shutter speed is more than the threshold value Th2 and is not more than the threshold value Th1, the separation frequency is set to f1, and when the shutter speed is not more than the threshold value Th2, the separation frequency is set to f2. Note that the present embodiment is described assuming that a threshold value is set for the shutter speed and the separation frequency is set in comparison with the threshold value. However, the present invention is not necessarily implemented in such a way. As described above, the lower the shutter speed is, the longer the exposure time is, and as a result, the influence of accumulated shake on the output signal may be prominent. Therefore, the present invention may be implemented such that the lower the shutter speed, the lower the separation frequency.

In step S504, the control unit 119 determines whether or not the shake correction mode has been cancelled. Upon determining that the shake correction mode has been cancelled, the control unit 119 ends the image stabilization control processing. Upon determining that the shake correction mode has not been cancelled, the control unit 119 returns processing to step S501, and repeats the same processing on the next frame (or the frame for which the shutter speed determination is to be performed).

Thus, with the image stabilization control apparatus according to the present embodiment, it is possible to change the amount of correction allocated to electronic shake correction and optical shake correction in accordance with shutter speed, and to realize favorable image blur correction, further consideration given to conditions for image capturing.

Modification

The embodiment above is described assuming that, as shown in FIG. 4A, a separation frequency has been set for each shutter speed in advance, and the frequency separation unit 203 changes the setting based on the input shutter speed. However, the present invention is not necessarily implemented in such a way.

The correction allocation change may be determined considering not only the shutter speed but also other image capturing settings or the like. For example, the amount of correction that can be applied to optical shake correction and electronic shake correction is determined based on at least one of the focal length and the zoom ratio. Therefore, the correction allocation change may be performed with consideration given to them. More specifically, the movable area that is to be subjected to correction performed by the video signal processing unit 111 is determined at least one of the focal length and the zoom ratio, and therefore the frequency separation unit 203 may specify the frequency band that can be allocated to the electronic shake correction control unit 118, based on the movable area.

Figure 4B:
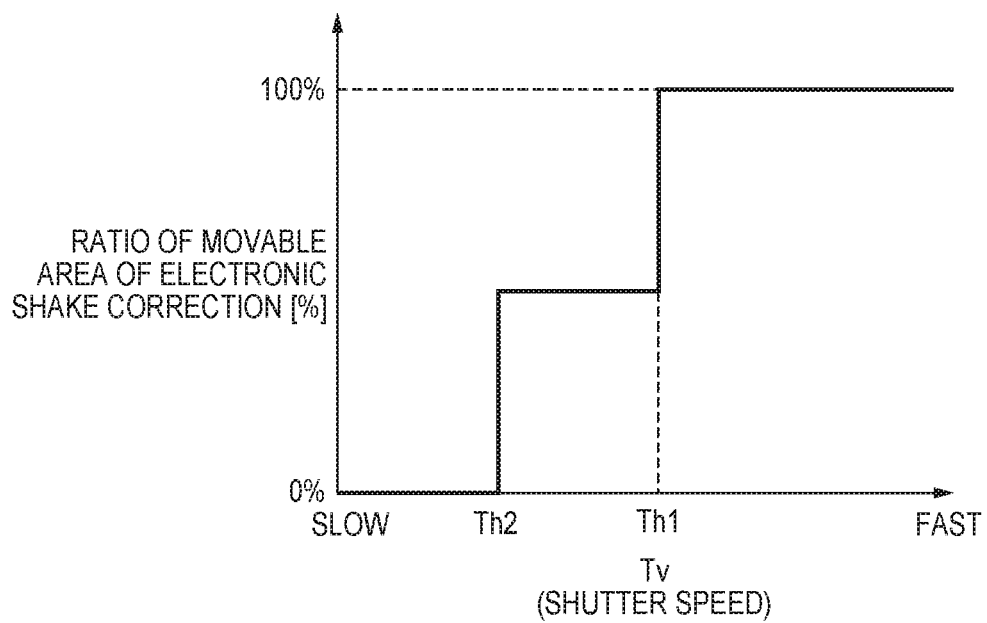

Here, when the shutter speed is determined as being a low speed, there may be an influence of accumulated shake. Therefore, the movable area for the video signal processing unit 111 is narrowed according to the shutter speed so as to be no greater than its maximum area determined based on at least one of the focal length and the zoom ratio. As shown in FIG. 4B, for example, the movable area change may be performed by determining the proportion (the usage ratio) of excessive pixels used for electronic shake correction, to the maximum movable area, according to the shutter speed. In the example shown in FIG. 4B, when the shutter speed is more than the predetermined value Th1, the entire movable area (the maximum area) determined based on at least one of the focal length and the zoom ratio is determined to be used for electronic shake correction. As the shutter speed decreases from Th1, control is performed such that the usage ratio of the movable area is reduced to 50%, 25%, and so on, and thus the proportion of electronic shake correction is reduced. When the movable area is changed, the frequency separation unit 203 may change the separation frequency based on information regarding the limitation on the changed movable area so that the angular velocity signal in the frequency band that cannot be corrected in the area is to be corrected by the shake correction lens unit 103.

With such a configuration, it is possible to more favorably determine the frequency component that is to be corrected by the electronic shake correction control unit 118, based on the amount of correction that is acceptable for the video signal processing unit 111.

Second Embodiment

The first embodiment and the modification above show a mode in which the present invention is applied to the digital camera 100 integrated with a lens. However, the present invention is not limited in such a way. Needless to say, the present invention is applicable to an interchangeable lens image capturing apparatus. That is, the present invention can be implemented if the components for optical shake correction and components for electronic shake correction are respectively provided in separate devices that are to be integrated into one piece when used.

The following embodiment describes a mode in which the present invention is implemented as an image capturing system that includes a camera body and an interchangeable lens. Note that the image capturing system according to the present embodiment further includes the function of performing shake correction by controlling the position and the rotation of the image sensor, in addition to optical shake correction by driving the shift lens and electronic shake correction performed by controlling a region that is to be extracted from a captured image, which are described above.

Configuration of Image Capturing System 600

Figure 6:
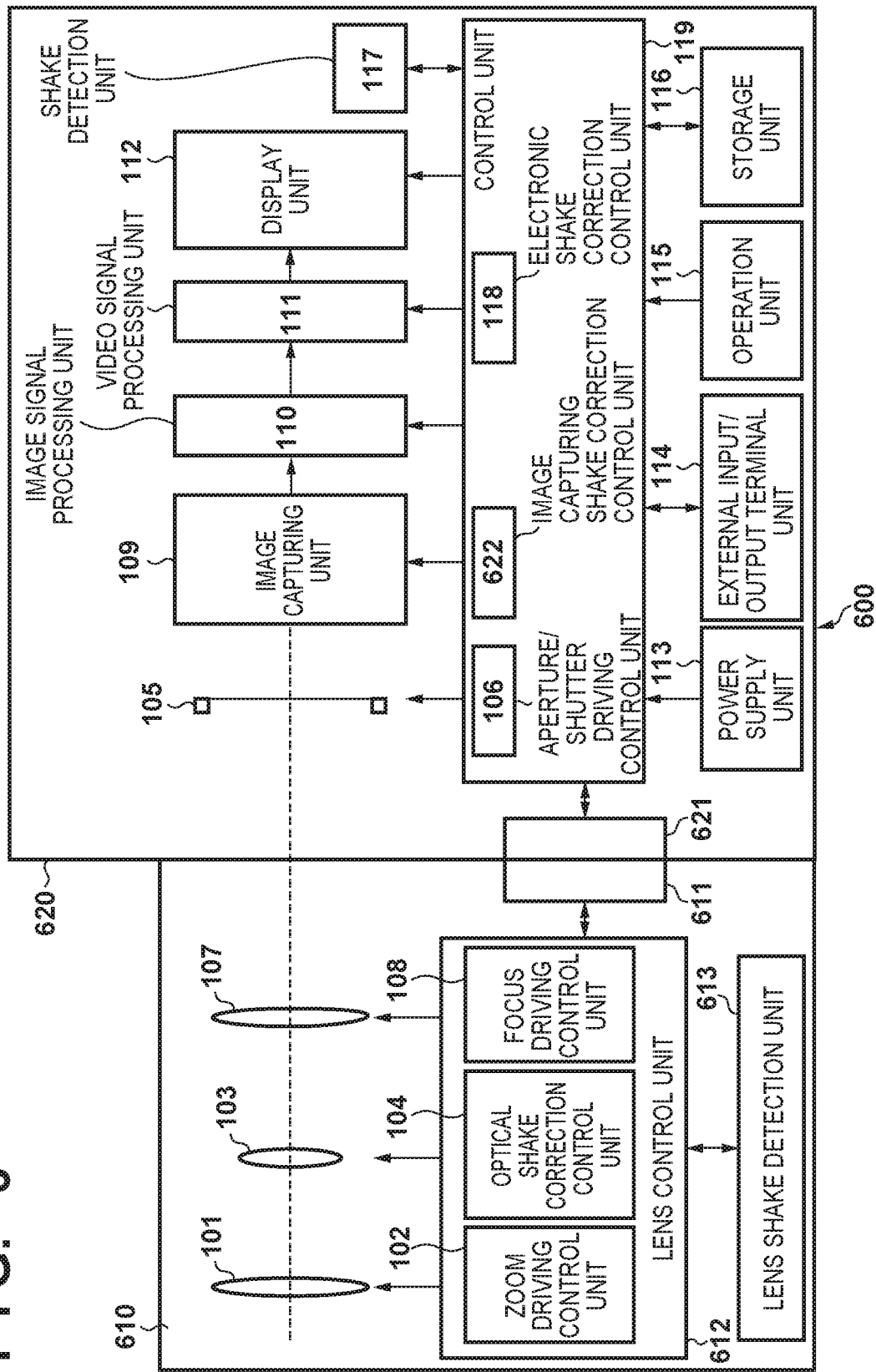
FIG. 6 is a block diagram showing a functional configuration of an image capturing system 600 according to a second embodiment of the present invention.

First, the following describes a functional configuration of an image capturing system 600 according to the present embodiment with reference to a block diagram shown in FIG. 6. Note that, in the configuration of the image capturing system 600, components that are the same as those in the digital camera 100 according to the first embodiment are assigned the same reference numerals and descriptions thereof are omitted. The following describes characteristic components of the image capturing system 600 according to the present embodiment.

In FIG. 6, the image capturing system 600 includes an interchangeable lens 610 and a camera body 620 that are connected to each other. The interchangeable lens 610 and the camera body 620 are configured to be able to communicate with each other when their respective mount contact portions 611 and 621 are in contact with each other.

The interchangeable lens 610 includes a lens control unit 612 that is independent of the camera body 620, to control each block of the interchangeable lens 610. The lens control unit 612 may control operations of the blocks by loading operation programs for the blocks, stored in a storage unit (not shown), to a memory, and executing the programs. Also, the interchangeable lens 610 includes a lens shake detection unit 613 that is separate from the camera body 620 and is configured to be able to detect the occurrence of shake by itself. The lens shake detection unit 613 may have the same configuration as the shake detection unit 117. The lens shake detection unit 613 includes an angular velocity sensor and so on, detect shake of the interchangeable lens 610 or the camera body 620, and outputs the amount of shake. Thus, the interchangeable lens 610 is configured to be able to realize a shake correction function by itself, and is also able to transmit various control amounts and so on related to shake correction to the control unit 119 via the mount contact portions 611 and 621. Note that power related to the driving of the interchangeable lens 610 may be supplied from the power supply unit 113 of the camera body 620 via the mount contact portions 611 and 621.

On the other hand, in the camera body 620 according to the present embodiment, the image capturing unit 109 includes an image sensor configured to be rotatable about the optical axis and movable in a direction that is orthogonal to the optical axis, a driving mechanism for driving the image sensor, a state detection sensor, and so on. The driving of the image sensor is controlled by an image capturing shake correction control unit 622. That is, in the image capturing system 600 according to the present embodiment, the image sensor and the image capturing shake correction control unit 622 are components for correcting an image blur caused by shake of the image capturing system 600. The image capturing shake correction control unit 622 corrects an image blur by driving the image sensor so as to correct displacement and rotation of an optical image of the subject formed on the image sensor, caused by shake. Thus, in the present embodiment, the image sensor and the image capturing shake correction control unit 622 serve as a third correction means according to the present invention, which realizes a mechanical shake correction type correction function, by which an image blur is mechanically corrected.

In the present embodiment, the camera body 620 and the interchangeable lens 610 respectively include the shake detection unit 117 and the lens shake detection unit 613. Therefore, driving control related to shake correction may be performed using the respective outputs from the camera body 620 and the interchangeable lens 610. Alternatively, driving control related to shake correction may be performed by the devices sharing an output from the shake detection unit of one of them. In the present embodiment, as in the first embodiment, the optical shake correction control unit 104 mainly performs image stabilization control processing including correction allocation change. Therefore, information regarding the amount of shake, output by the lens control unit 612 of the interchangeable lens 610, is used to control both of the devices. Also, the aperture/shutter unit 105 and the aperture/shutter driving control unit 106 are included in the camera body 620, and therefore information regarding the shutter speed is supplied to the optical shake correction control unit 104 by the control unit 119 via the mount contact portions 611 and 621.

Configuration Related to Shake Correction Function

Figure 7:
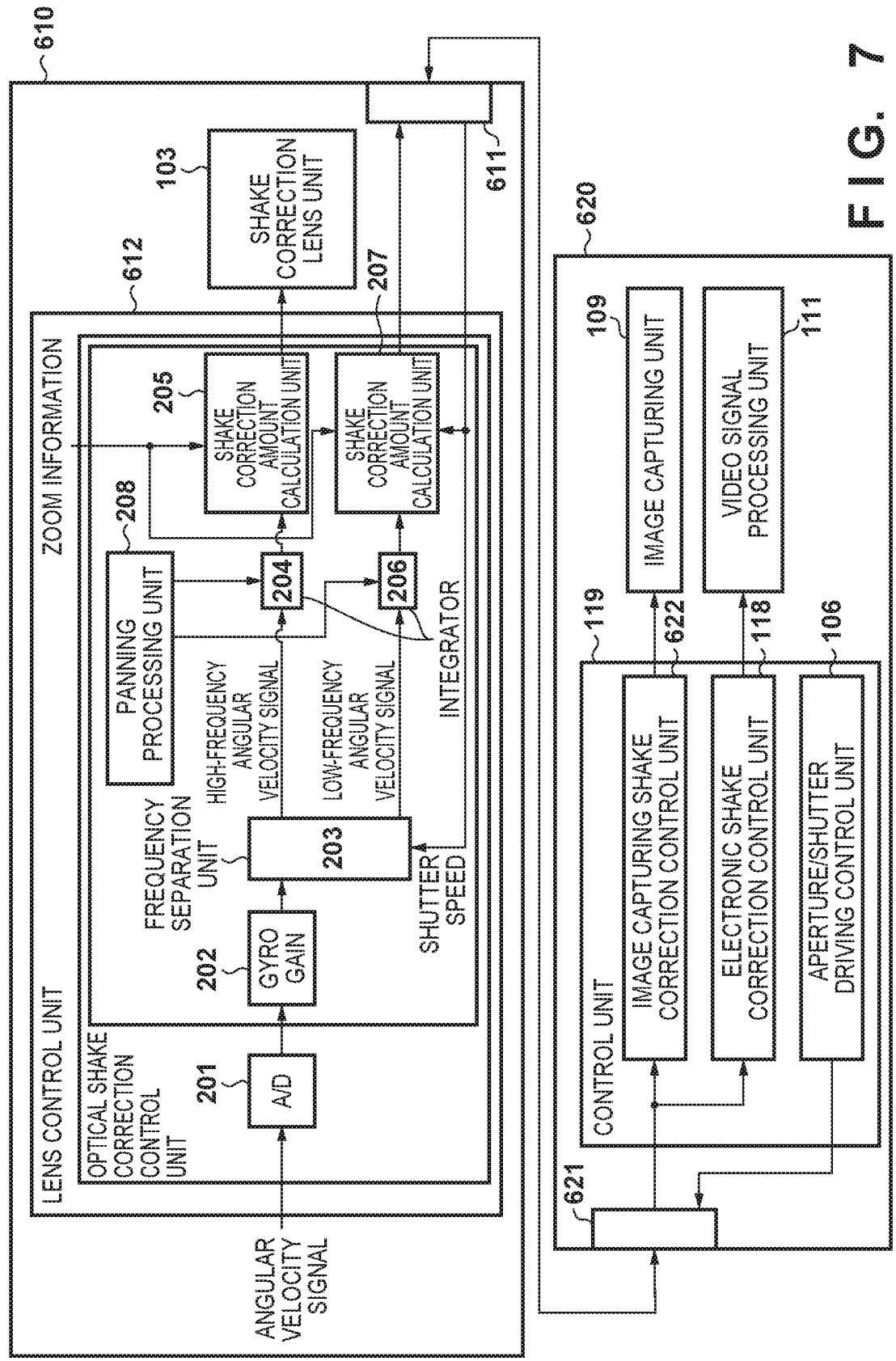
FIG. 7 is a block diagram showing a configuration of a shake correction function according to the second embodiment of the present invention.

Next, the following describes a configuration related to a shake correction function realized by the image capturing system 600 according to the present embodiment with reference to a block diagram shown in FIG. 7. Although the example in FIG. 7 shows that, as in the first embodiment, various blocks related to the realization of this function are realized by the optical shake correction control unit 104, the present invention is not necessarily implemented in such a way. Note that, in descriptions of components related to the shake correction function according to the present embodiment, components that are the same as those in the first embodiment related to the same function are assigned the same reference numerals and descriptions thereof are omitted.

The integrator 206 and the shake correction amount calculation unit 207 derive a shake correction amount related to correction operations that are to be performed in the camera body 620, based on a low-frequency angular velocity signal output from the frequency separation unit 203. In the present embodiment, the camera body 620 has a mechanical shake correction function in addition to electronic shake correction function, and therefore the shake correction amount calculation unit 207 drives correction amounts related to both types of shake correction. As in the above-described modification, the movable area that is to be subjected to electronic shake correction performed by the video signal processing unit 111, which is determined based on at least one of the focal length and the zoom ratio, is limited according to the shutter speed, and the shake correction amount calculation unit 207 derives the amount of shift with consideration given to the limitation. More specifically, to correct the low-frequency angular velocity signal separated by the frequency separation unit 203 based on the separation frequency set according to the shutter speed, the amount of correction that is to be performed using the electronic shake correction method is derived such that correction is performed within the limited movable area. On the other hand, the low-frequency angular velocity signal includes frequency components that are not corrected using electronic shake correction due to the limitation. Therefore, the image capturing system 600 according to the present embodiment corrects such components using mechanical shake correction. Therefore, due to the movable area limited according to the shutter speed, when the shake correction amount calculation unit 207 performs control to reduce the amount of correction that is to be performed through electronic shake correction, the amount of correction that is to be performed through mechanical shake correction related to the low-frequency angular velocity signal is derived so as to supplement the reduction. The mechanical and electronic shake correction amounts derived by the shake correction amount calculation unit 207 are transmitted to the electronic shake correction control unit 118 and the image capturing shake correction control unit 622 via the mount contact portions 611 and 621.

Note that, in the present embodiment, the shake correction amount calculation unit 207 determines the amounts of correction that are to be allocated to electronic shake correction and mechanical shake correction, respectively, according to the movable area limited by the video signal processing unit 111 based on at least one of the focal length and the zoom ratio. However, the present invention is not necessarily implemented in such a way. As in the case of the frequency separation unit 203, a separation frequency for separating a low-frequency angular velocity signal into even smaller frequency components may be provided and allocation may be performed by changing the separation frequency according to the shutter speed. In this case, in order to reduce the influence of accumulated shake, a low-frequency angular velocity signal may be separated with reference to a frequency that is the second threshold value according to the present invention, into an angular velocity signal with a frequency component more than the threshold value and an angular velocity signal with a frequency component less than the threshold value, and input to the integrator 206. In the present embodiment, such separation is performed by the frequency separation unit 203. However, the separation may be performed by another element that is configured to be able to acquire information regarding the shutter speed, the focal length, and the zoom ratio. Then, the integrator 206 and the shake correction amount calculation unit 207 may process the separated angular velocity signals and derive correction amounts that are to be allocated to electronic shake correction and mechanical shake correction.

Thus, the image capturing system 600 according to the present embodiment performs correction by three types of correction to suppress accumulated shake, and reduce the influence of shake of the image capturing system 600 on the output signal.

Image Stabilization Control Processing

Figure 8:
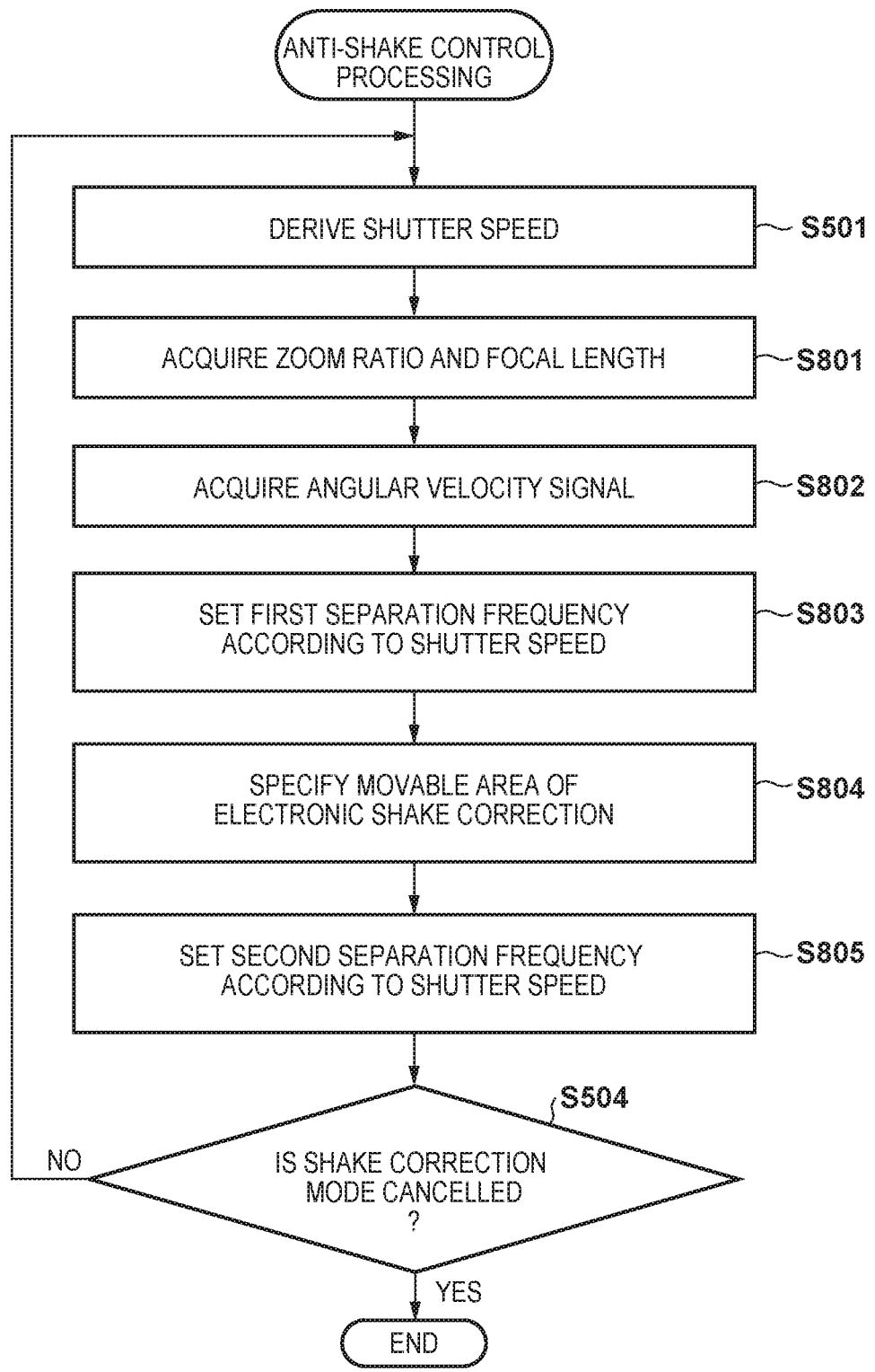
FIG. 8 is a flowchart illustrating image stabilization control processing that is executed by the image capturing system 600 according to the second embodiment of the present invention.

The following specifically describes image stabilization control processing performed by the image capturing system 600 according to the present embodiment with reference to the flowchart shown in FIG. 8. Processing according to the flowchart is realized by the control unit 119 reading a processing program corresponding to the processing, stored in the storage unit 116, for example, loading the program to a memory (not shown), and executing the program. The image stabilization control processing in the following description is started when the camera body 620, which has been set to the shake correction mode, performs through-the-lens display or moving image shooting, for example.

Note that in the image stabilization control processing according to the present embodiment, steps in which the same processing as in the image stabilization control processing according to the first embodiment are assigned the same reference numerals and descriptions thereof are omitted. The following describes steps in which characteristic processing according to the present embodiment is performed.

In step S501, upon receiving a shutter speed that has been derived, the optical shake correction control unit 104 acquires information regarding the zoom ratio and the focal length related to image capturing in step S801 from the zoom driving control unit 102 and the focus driving control unit 108.

In step S802, the A/D conversion unit 201 and the gyro gain unit 202 acquire a digital angular velocity signal that is to be corrected in relation to the frame, based on an analogue angular velocity signal related to shake detected by the lens shake detection unit 613.

In step S803, the frequency separation unit 203 first sets the separation frequency (the first separation frequency) for separating the high-frequency angular velocity signal that is to be corrected by the shake correction lens unit 103, based on the shutter speed. As in the first embodiment, the first separation frequency may be set by comparing a predetermined threshold value and the shutter speed as shown in FIG. 4A.

In step S804, the frequency separation unit 203 specifies the movable area that is to be subjected to electrical shake correction performed by the video signal processing unit 111, based on information regarding the shutter speed, the zoom ratio, and the focal length. Specifically, the frequency separation unit 203 first specifies the movable area (the maximum movable area) that is to be subjected to electronic shake correction, which is independent of the shutter speed, based on information regarding the zoom ratio and the focal length. Thereafter, the frequency separation unit 203 determines whether or not to limit the movable area that is to be subjected to the correction, according to the shutter speed. The determination may be performed by comparing the predetermined threshold for the shutter speed with the shutter speed to specify the usage ratio as shown in FIG. 4B. Then, the frequency separation unit 203, after performing the determination, specifies the movable area (corresponding to "the number of excessive pixels in the maximum movable area"×"the usage ratio"+"the number of pixels in the output signal") that is to be subjected to ultimate electronic shake correction.

In step S805, the frequency separation unit 203 sets the separation frequency (the second separation frequency) for separating the angular velocity signal into frequency components that are to be allocated to electronic shake correction and mechanical shake correction, respectively, based on information regarding the movable area that is to be subjected to electronic shake correction, and returns processing to step S504. The second separation frequency set in this step is different from the first separation frequency set in step S803 in that the second separation frequency is less than the first separation frequency and can be used to further separate the low-frequency angular velocity signal into two frequency components. The lower the shutter speed is, the smaller the movable area that is to be subjected to electronic shake correction is, compared to the maximum area. Therefore, the frequency band (a frequency range that is less than the first separation frequency and more than the second separation frequency) that is to be allocated to mechanical shake correction is expanded according to the shutter speed.

In this way, the second separation frequency that is used for allocation to electronic shake correction and mechanical shake correction is set in this step, and therefore the frequency separation unit 203 can separate the input angular velocity signal into signals with which the shake correction lens unit 103, the video signal processing unit 111, and the image sensor perform correction.

As described above, according to the image capturing system according to the present embodiment, it is possible to suppress accumulated shake and realize favorable shake correction corresponding to the shutter speed in a system that has an optical shake correction function, an electronic shake correction function, and a mechanical shake correction function.

Modification

In the above-described first and second embodiments, the angular velocity signal is separated into components that are to be allocated to the respective shake correction methods, using the (first and second) separation frequencies, regardless of the direction in which shake correction is performed. However, the (first and second) separation frequencies may vary depending on the direction in which shake correction is performed. It is unnecessary to correct shake in all of the rotational directions using all of the shake correction methods employed in an image capturing system (a camera integrated with a lens, or a camera body and an interchangeable lens). For example, in the second embodiment, the optical shake correction method and the electronic shake correction method may be used to perform shake correction in a pitch direction and a yaw direction, and shake correction in a roll direction may be performed using two methods, namely the electronic shake correction method and the mechanical shake correction method. If this is the case, angular velocity signals related to the pitch direction and the yaw direction separated using the first and second separation frequencies according to the second embodiment may be allocated to the respective correction methods. At this time, it is preferable that a frequency that is used to separate the angular velocity signal related to the roll direction so as to be allocated to the electronic shake correction method and the mechanical shake correction method may also be changed according to the shutter speed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-250100, filed Dec. 26, 2017, which is hereby incorporated by reference herein in its entirety.

What is claimed is:

1. An image stabilization control apparatus comprising:
a detection unit configured to detect shake of an image capturing apparatus;
an acquisition unit configured to acquire information regarding a shutter speed related to image capturing that is to be performed by the image capturing apparatus; and
a control unit configured to perform control to cause a first correction unit and a second correction unit that respectively employ different correction methods, to correct shake detected by the detection unit, so as to change the allocation of correction of the shake to the first correction unit and the second correction unit based on information regarding the shutter speed acquired by the acquisition unit,
wherein the second correction unit employs an electronic shake correction method, and corrects the shake by changing a region that is to be extracted from an image signal acquired through image capturing, wherein an upper limit of a movable area that can be used to extract the region from the image signal, that is to be subjected to correction performed by the second correction unit, is determined based on at least one of a focal length and a zoom ratio related to image capturing that is to be performed by the image capturing apparatus, and
the control unit changes the movable area to be an area that is not greater than the upper limit according to the shutter speed.

2. The image stabilization control apparatus according to claim 1,
wherein the first correction unit employs an optical shake correction method to control operations of an image optical system of the image capturing apparatus to move the position of an image formed on an image sensor and thereby correct the shake.

3. The image stabilization control apparatus according to claim 1,
wherein the control unit changes a degree of electronic shake correction by the second correction unit such that the lower the shutter speed is, the narrower the movable area is.

4. The image stabilization control apparatus according to claim 1,
wherein the control unit reduces the allocation of correction of the shake to the second correction unit and increases the allocation of correction of the shake to the first correction unit as the shutter speed decreases.

5. The image stabilization control apparatus according to claim 1, wherein the control unit separates the shake into frequency components, and allocates different frequency components that are to be corrected, to the first correction unit and the second correction unit, respectively.

6. The image stabilization control apparatus according to claim 5, further comprising:
a setting unit configured to set a first threshold value related to a frequency that is used to separate the shake into frequency components according to the shutter speed,
wherein the control unit allocates a frequency component of the shake that has a frequency more than the first threshold value to the first correction unit, and a frequency component of the shake that has a frequency less than the first threshold value to the second correction unit.

7. The image stabilization control apparatus according to claim 6, further comprising:
a third correction unit that employs a correction method that is different from the correction methods employed by the first correction unit and the second correction unit,
wherein the control unit allocates, out of the frequency component of the shake that has a frequency less than the first threshold value, a frequency component of the shake that has a frequency more than a second threshold value that is less than the first threshold value to the third correction unit, and a frequency component of the shake that has a frequency less than the second threshold value to the second correction unit.

8. The image stabilization control apparatus according to claim 7,
wherein the third correction unit moves the position of an image sensor of the image capturing apparatus to change the position of an image formed on the image sensor, and thereby correct the shake.

9. A non-transitory computer-readable storage medium storing a program for causing a computer to function as each unit, excluding the correction unit, of the image stabilization control apparatus according to claim 1.

10. An image stabilization control apparatus comprising:
a detection unit configured to detect shake of an image capturing apparatus;
an acquisition unit configured to acquire information regarding a shutter speed related to image capturing that is to be performed by the image capturing apparatus; and
a control unit configured to perform control to cause a first correction unit, a second correction unit and a third correction unit that respectively employ different correction methods, to correct shake detected by the detection unit, so as to change the allocation of correction of the shake to the first correction unit and the second correction unit based on information regarding the shutter speed acquired by the acquisition unit,
wherein the second correction unit employs an electronic shake correction method, and corrects the shake by changing a region that is to be extracted from an image signal acquired through image capturing, and
the control unit changes a movable area that can be used to extract the region from the image signal that is to be subjected to correction performed by the second correction unit, according to the shutter speed and controls the first correction unit and the second correction unit such that ratios of correction performed by the first correction unit and the third correction unit in correction performed by the first correction unit, the second correction unit and the third correction unit are higher in a first shutter speed than in a second shutter speed that is lower than the first shutter speed.

11. The image stabilization control apparatus according to claim 10,
wherein the upper limit of the movable area is determined based on at least one of a focal length and a zoom ratio related to image capturing that is to be performed by the image capturing apparatus, and
the control unit changes the movable area to be an area that is not greater than the upper limit according to the shutter speed.

12. The image stabilization control apparatus according to claim 10,
wherein the control unit allocates a frequency component of the shake that has a frequency more than a first threshold to the first correction unit, a frequency component of the shake that has a frequency less than the first threshold and has a frequency more than a second threshold value that is less than the first threshold to the third correction unit, and a frequency component of the shake that has a frequency less than the second threshold value to the second correction unit.

13. The image stabilization control apparatus according to claim 10,
wherein the first correction unit employs an optical shake correction method to control operations of an image optical system of the image capturing apparatus to move the position of an image formed on an image sensor and thereby correct the shake.

14. The image stabilization control apparatus according to claim 10,
wherein the third correction unit moves the position of an image sensor of the image capturing apparatus to change the position of an image formed on the image sensor, and thereby correct the shake.

15. An image capturing apparatus comprising:
a detection unit configured to detect shake of the image capturing apparatus;
a first correction unit and a second correction unit for correcting an influence of the shake detected by the detection unit, on a captured image, the first correction unit and the second correction unit employing different correction methods;
an acquisition unit configured to acquire information regarding a shutter speed related to image capturing that is to be performed by the image capturing apparatus; and
a control unit configured to perform control to cause the first correction unit and the second correction unit to correct shake detected by the detection unit, so as to change the allocation of correction of the shake to the first correction unit and the second correction unit based on information regarding the shutter speed acquired by the acquisition unit,
wherein the second correction unit employs an electronic shake correction method, and corrects the shake by changing a region that is to be extracted from an image signal acquired through image capturing, wherein an upper limit of a movable area that can be used to extract the region from the image signal, that is to be subjected to correction performed by the second correction unit, is determined based on at least one of a focal length and a zoom ratio related to image capturing that is to be performed by the image capturing apparatus, and the control unit changes the movable area to be an area that is not greater than the upper limit according to the shutter speed.

16. An image capturing system that includes an image stabilization control apparatus and an image capturing apparatus, the image capturing system comprising:
   a detection unit configured to detect shake of the image capturing apparatus;
   an acquisition unit configured to acquire information regarding a shutter speed related to image capturing that is to be performed by the image capturing apparatus; and
   a first correction unit and a second correction unit for correcting an influence of the shake detected by the detection unit, on a captured image, the first correction unit and the second correction unit employing different correction methods;
   a control unit configured to perform control to cause the first correction unit and the second correction unit to correct shake detected by the detection unit, so as to change the allocation of correction of the shake to the first correction unit and the second correction unit based on information regarding the shutter speed acquired by the acquisition unit,
   wherein the second correction unit employs an electronic shake correction method, and corrects the shake by changing a region that is to be extracted from an image signal acquired through image capturing, wherein an upper limit of a movable area that can be used to extract the region from the image signal, that is to be subjected to correction performed by the second correction unit, is determined based on at least one of a focal length and a zoom ratio related to image capturing that is to be performed by the image capturing apparatus, and
   the control unit changes the movable area to be an area that is not greater than the upper limit according to the shutter speed.

17. A method for controlling an image stabilization control apparatus, the method comprising:
   detecting shake of an image capturing apparatus;
   acquiring information regarding a shutter speed related to image capturing that is to be performed by the image capturing apparatus; and
   performing control to cause a first correction unit and a second correction unit that respectively employ different correction methods, to correct the detected shake, so as to change the allocation of correction of the shake to the first correction unit and the second correction unit based on information regarding the acquired shutter speed,
   wherein the second correction unit employs an electronic shake correction method, and corrects the shake by changing a region that is to be extracted from an image signal acquired through image capturing, wherein an upper limit of a movable area that can be used to extract the region from the image signal, that is to be subjected to correction performed by the second correction unit, is determined based on at least one of a focal length and a zoom ratio related to image capturing that is to be performed by the image capturing apparatus and
   the control is performed such that a movable area is changed to be an area that is not greater than the upper limit according to the shutter speed.

* * * * *